United States Patent [19]

Kuok

[11] Patent Number: 4,926,461
[45] Date of Patent: May 15, 1990

[54] TELEPHONE ANSWERING MACHINE HAVING CALL TRANSFER CAPABILITIES

[75] Inventor: Henry Kuok, Syracuse, N.Y.

[73] Assignee: Code-A-Phone Corporation, Clackamas, Oreg.

[21] Appl. No.: 162,482

[22] Filed: Mar. 1, 1988

Related U.S. Application Data

[63] Continuation-in-part of Ser. No. 2,222, Jan. 12, 1987, abandoned.

[51] Int. Cl.⁵ .................. H04M 1/65; H04M 3/58
[52] U.S. Cl. ............................ 379/67; 379/77; 379/212
[58] Field of Search .............. 379/88, 67, 211, 212, 379/214, 77

[56] References Cited

U.S. PATENT DOCUMENTS

| | | | |
|---|---|---|---|
| 3,867,582 | 2/1975 | Weed et al. | 379/198 |
| 3,989,901 | 11/1976 | Neuwirth et al. | 379/74 |
| 4,086,438 | 4/1978 | Kahn et al. | 379/158 |
| 4,376,875 | 3/1983 | Beirne | 379/88 |
| 4,476,349 | 10/1984 | Cottrell et al. | 379/214 |
| 4,484,031 | 11/1984 | Gray et al. | 379/212 |
| 4,591,664 | 5/1986 | Freeman | 379/73 |
| 4,625,081 | 11/1986 | Lotito et al. | 379/88 |
| 4,645,879 | 2/1987 | Simmons | 379/355 |
| 4,737,982 | 4/1988 | Boratgis et al. | 379/202 |
| 4,747,124 | 5/1988 | Ladd | 379/67 |

OTHER PUBLICATIONS

Telesensory Speech Systems, Manual, T/VIS Application Note AN-Ol, "Receiving DTMF While Talking", pp. 1–4, ©1983.

Primary Examiner—Thomas W. Brown
Attorney, Agent, or Firm—Stoel Rives Boley Jones & Grey

[57] ABSTRACT

A telephone answering machine adapted for use in conjunction with a telephone system having a station-to-station call transfer capability for incoming calls includes a tape deck and various components for recording and playing back announcements and messages under microprocessor control. The answering machine also includes a DTMF receiver and DTMF generator for receiving and sending digit tone signals. The microprocessor directs the operation of the answering machine for recording data from a calling party, which data represent a telephone number to which the calling party wishes to be transferred. Thereafter, the microprocessor directs the operation of the answering machine for dialing this telephone number after a hook flash has been used to request a call transfer sequence by the telephone system. The telephone answering machine thereby enables call transfers to take place upon the initiative of calling parties.

8 Claims, 4 Drawing Sheets

TELEPHONE ANSWERING MACHINE HAVING CALL TRANSFER CAPABILITIES

This application is a continuation-in-part of Application Ser. No. 002,222, filed Jan. 12, 1987, now abandoned.

BACKGROUND OF THE INVENTION

The present invention relates to telephone systems and more specifically to telephone answering machines and to telephone systems having "call conferencing" features.

Telephone systems providing localized exchange functions, such as private branch exchange and Centrex systems frequently provide call conferencing features. In accordance with these features, users of telephones within the systems may, among other things, execute station-to-station call transfers whereby incoming telephone calls can be transferred to other telephones. However, if a conventional telephone answering machine is employed to answer incoming calls to a telephone within such a system, no mechanism has heretofore existed for taking advantage of the call conferencing station-to-station call transfer capability provided by the system. Consequently, in such cases, the calling party has not been able to initiate a transfer to another telephone. The calling party must hang up and redial in order to reach another telephone even though this other telephone may be within the same local system as the telephone originally dialed.

It is, therefore, an object of the present invention to provide a telephone answering machine which additionally allows a calling party to take advantage of the station-to-station call transfer capability provided by many telephone systems.

It is another object of the present invention to provide a telephone answering machine which automatically executes call transferring procedures in response to prompts and data supplied by a calling party in the form of digit tones.

It is a further object of the present invention to provide a telephone answering machine adapted for allowing calling parties to make station-to-station call transfers which is simple to use, economical to construct and efficient in operation.

SUMMARY OF THE INVENTION

The present invention comprises a telephone answering machine for use in conjunction with a telephone system which has a station-to-station call transfer capability. The telephone answering machine includes a tape deck and various other components adapted for recording and playing back announcements and messages in the conventional fashion. The telephone answering machine also includes a dual tone multifrequency ("DTMF") receiver and a DTMF generator the functioning of which are regulated by a microprocessor in accordance with microcode routines.

In operation, the DTMF receiver may receive digit tone signals during message recording by the answering machine. The DTMF receiver supplies data to the microprocessor corresponding to any digit tone signals it receives. Upon receipt of appropriate data representing a prompt signal, the microprocessor reads and stores data corresponding to further digit tones supplied by the calling party. This data represents the digits for a telephone number, extension number or operator number to which a calling party wishes to be transferred. After the data is fully received, the microprocessor executes a hook flash and thereby initiates a call transfer sequence by the telephone system.

The microprocessor then regulates the DTMF generator to generate digit tone signals corresponding to the stored data and the number provided by the calling party. The digit tone signals are routed by direction of the microprocessor onto the telephone line to which the answering machine is coupled. The number of the telephone desired to be reached by the calling party is thereby automatically dialed by the answering machine. After the number is dialed, the microprocessor directs the answering machine to disengage from the telephone line and thereby disconnecting the answering machine from the associated telephone line. When the telephone at the number dialed is answered, the calling party is placed in contact with a party at another telephone in accordance with the number which the calling party provided.

DETAILED DESCRIPTION OF PREFERRED EMBODIMENT

Figure 1:
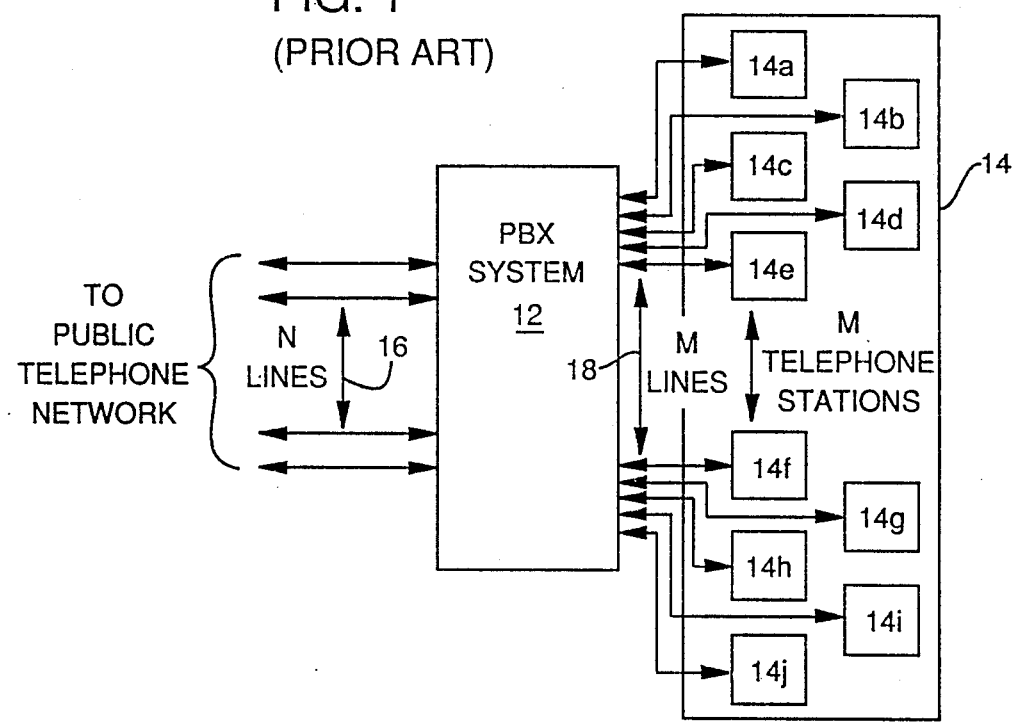
FIG. 1 is an overall block diagram of a private branch exchange (PBX) telephone system for serving a large number of telephones in conjunction with which the present invention can be utilized.

Referring now to FIG. 1, the present invention constitutes a telephone answering machine which is adapted for use in conjunction with a conventional private branch exchange ("PBX") system such as the system 12 or any other telephone system having "call conferencing" features such as a Centrex system. The PBX system 12 is connected on N number of outside telephone lines 16 to the public telephone network whereby calls can be placed to locations remote from the PBX system 12. The PBX system 12 is also connected on M number of lines 18 to M number of telephone stations 14 such as the individual telephone stations 14a–14j. Each of the telephone stations 14a–14j would ordinarily include a conventional telephone set. It should be noted that the number M of lines 18 (and stations 14) would generally be substantially greater than the number N of outside lines 16. Use of the PBX system reduces the number of outside lines necessary to adequately serve the stations 14.

The PBX system 12 provides for call conferencing by the users of the telephone stations 14. Among other things, call conferencing allows incoming calls to be transferred from one telephone station to another telephone station by direction of a station user (at the initiative of called party). For example, when an incoming call is received by the PBX system 12 on one of the outside lines 16 for a particular telephone station such as station 14a, the PBX system 12 automatically connects the outside line carrying the call to this station (by way of the particular one of the lines 18 connected to the station 14a) in accordance with the number dialed by the calling party. If the called party using station 14a wishes to transfer the call he then simply executes a "hook flash" on his telephone set. A hook flash constitutes a momentary depression of the switch hook of a telephone set.

The signal produced by the hook flash is interpreted by the PBX system as a call conferencing (or call transfer) request. The PBX system 12 thereupon disconnects the line carrying the incoming call from telephone station 14a and places the incoming call on hold. The called party may then dial a number corresponding to another telephone such as, for example, telephone station 14d. If this call is answered by a user at telephone station 14d, the party originally called at station 14a may execute another hook flash in response to which the PBX system 12 will couple both of the telephone stations 14a and 14d to the line carrying the original incoming call. Thereafter, the called party at telephone station 14a may hang up leaving the outside line carrying the original incoming call connected to the telephone station 14d (by way of the particular one of the lines 18 connected to the station 14d) and leaving the calling party in communication with a user of the station 14d.

Figure 2:
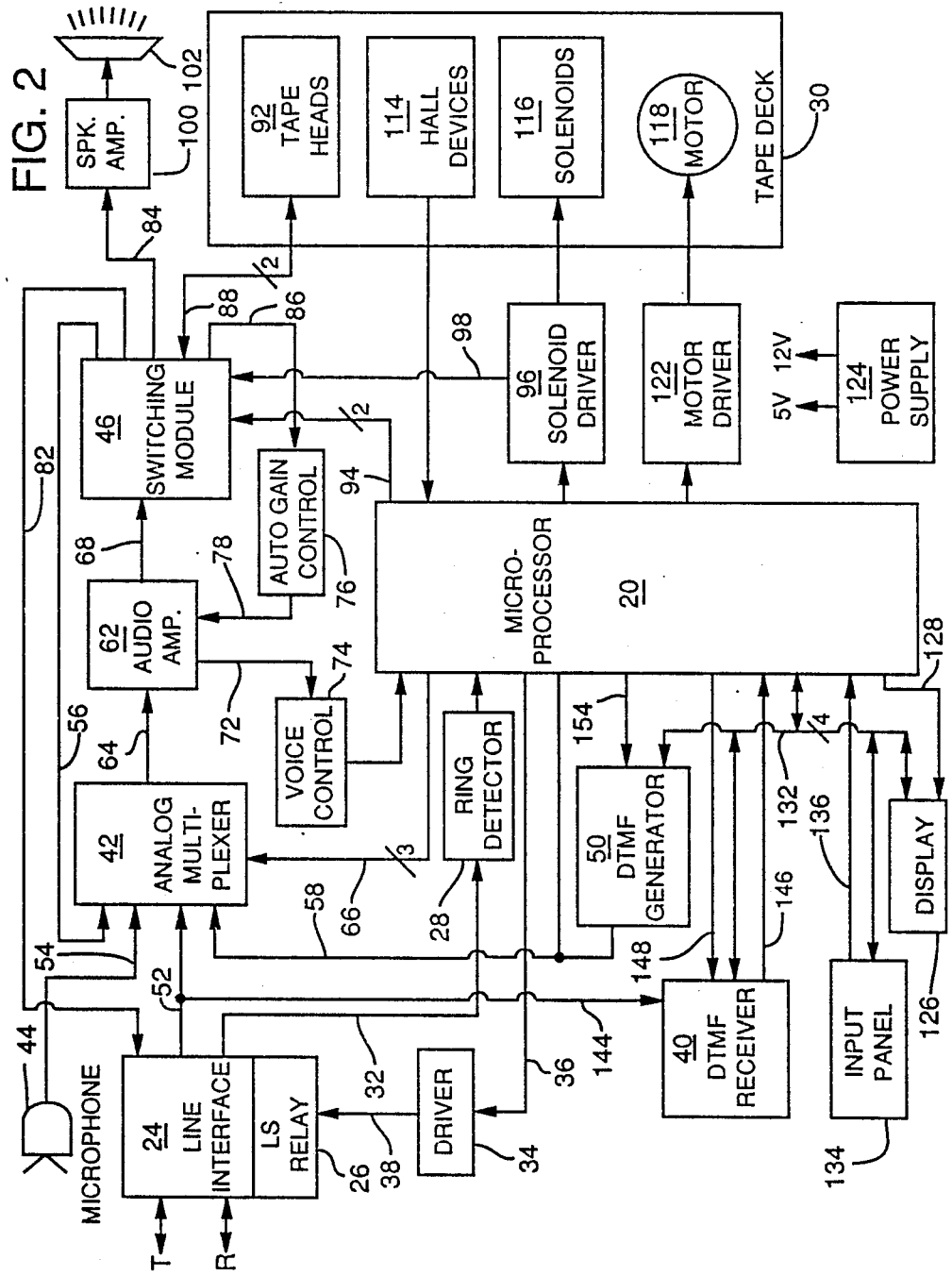
FIG. 2 is a schematic block diagram of a telephone answering machine in accordance with the present invention which could be used at one of the telephone stations shown in FIG. 1.

Referring now to FIG. 2, a block diagram is shown for a telephone answering machine which incorporates the present invention and which could be used in one of the telephone stations 14. The telephone answering machine includes a tape deck 30 having two tape assemblies and various other components for processing audio signals and performing other necessary functions associated with recording and playing back announcements and messages under control of the microprocessor 20 in the conventional manner. However, the answering machine also includes a dual tone multifrequency ("DTMF") receiver 40 and a DTMF generator 50 for processing digit tone signals. Among other things, the microprocessor 20 controls the DTMF receiver 40 and the DTMF generator 50 and the other components of the answering machine in accordance with special microcode routines for making call transfers as will be later described in detail.

The line interface 24 is connected to the tip and ring leads of an external telephone line circuit for receiving the input to and providing the output from the answering machine. The line interface 24 includes a line siezure ("LS") relay 26 which functions to complete the connection between the external telephone circuit and the internal circuitry of the answering machine and thereby take the answering machine off and on hook in response to appropriate control signals from the microprocessor 20. The line interface 24 employs an optical coupler to generate a signal indicative of a ring signal in the external telephone circuit which is provided to the ring detector 28 on the line 32. The ring detector 28 processes this signal and supplies a corresponding signal to the microprocessor 20 which the microprocessor 20 can use to determine if an actual ring signal is being received. When the microprocessor 20 determines that a ring signal has been received it supplies an appropriate control signal to the LS relay 26 by way of the driver 34 and the lines 36 and 38 to engage the telephone line and thereby answer the telephone.

The analog multiplexor 42 is connected for separately receiving input signals from the line interface 24, the microphone 44 (which is used for local recording of announcements), the switching module 46, and the DTMF generator 50 on the lines 52, 54, 56 and 58, respectively. The analog multiplexor 42 functions to select one of these input signals for supply to the audio amplifier 62 on line 64 in response to control signals provided on the line 66 (which contains three leads) from the microprocessor 20. The input signal which is selected by the analog multiplexor 42 to be provided to the audio amplifier 62 for amplification depends on the mode in which the answering machine is operating.

The primary function of the audio amplifier 62 is to furnish appropriately amplified signals to the switching module 46 on the line 68. However, the audio amplifier also supplies a signal on the line 72 to the voice control component 74. The voice control component 74 processes this signal and provides a corresponding signal to the microprocessor 20 which the microprocessor 20 can use to determine when, among other things, speech related signals are not being provided on the external telephone circuit. The audio amplifier 62 can also receive an input signal from the automatic gain control component 76 on the line 78. This gain control signal is used to regulate the output of the audio amplifier 62 during recording operations so that the output of the audio amplifier 62 can be maintained at a consistent level.

The switching module 46 receives an input signal on the line 68 and provides output signals on the lines 56, 82, 84 and 86. The line 88 connects the switching module 46 to the tape head component 92 and can serve both as an output line from the module 46 during recording and as an input line to the module 46 during playback. The switching module 46 functions to select when the analog multiplexor 42, the line interface 24, the speaker amplifier 100 (and the speaker 102 which is used for local playback of messages), the tape heads 92 and/or the automatic gain control component 76 will receive input signals on the lines 56, 82, 84, 88 and 86, respectively. The switching module 46 provides its selection function in response to control signals supplied by the microprocessor 20 on the line 94 and by the solenoid driver 96 on line 98. The operations of the analog multiplexor 42 and the switching module 46 are coordinated by the microprocessor 20 in order to provide the proper routing of audio signals within the answering machine depending on the mode in which the answering machine is operating. For example, when an announcement is being played to a calling party, an audio signal is picked up by the announcement head in the tape head component 92 and proceeds on line 88 to the switching module 46, from the module 46 on line 56 to analog multiplexor 42, from the multiplexor 42 on line 64 to audio amplifier 62 and from the amplifier 62 on line 68 again to module 46 from where it is directed on line 82 to line interface 24. When a message is being recorded an audio signal proceeds from the line interface 24 on line 52 to the analog multiplexer 42, from the multiplexer 42 on line 64 to the audio amplifier 62, from the amplifier 62 on line 68 to the switching module 46 and finally from the module 46 on lines 86 and 88 to the gain control component 76 and the message head in the tape head component 92.

The tape head component 92 is included in a conventional tape deck 30 which also comprises two hall devices 114, three solenoids 116 and a motor unit 118. The tape deck 30 is adapted for using two tape assemblies for separately recording and playing back announcements for calling parties and messages from calling parties. The hall devices 114 function magnetically for providing signals to the microprocessor 20 indicative of when the tape assemblies are being properly driven by the motor unit 118. The solenoids 116 are controlled by the microprocessor 20 by means of the solenoid driver 96 to engage the motor 118 for driving the tape assemblies as required for recording, playback and fast forward operations. The motor 118 provides the mechanical action necessary for driving the tape assemblies in accordance with electrical power supplied by the motor driver 122 which is also controlled by the microprocessor 20.

The power supply 124 provides a stable source of 5 V and 12 V DC power as required for the functioning the active components of the answering machine. The display 126 provides a visual indication of various information relating to the operations of the answering machine including, for example, the number of messages recorded from calling parties. The display 126 consists of two decimal digits which are controlled in accordance with signals supplied by the microprocessor 20 on the line 128 and over the bus 132 which contains four two way data transmission leads. The input panel 134 includes a number of input keys whereby the user can provide different types of input signals to the microprocessor 20 on the line 136 and over bus 132 for controlling the functioning of the answering machine.

The dual tone multifrequency ("DTMF") receiver 40 also receives the audio input signals (digit tones) provided by the line interface 24 on line 144 which is connected to the output line 52 from the line interface 24. The DTMF receiver 40 signals the microprocessor 20 on line 146 when it receives a valid digit tone signal. If such a signal is received during message recording, the microprocessor 20, thereafter interrupts its operations and runs the DV interrupt routine shown in FIG. 3. The line 148 is used to transmit the required enable signals to the DTMF receiver 40 for its proper operation.

Figure 3:
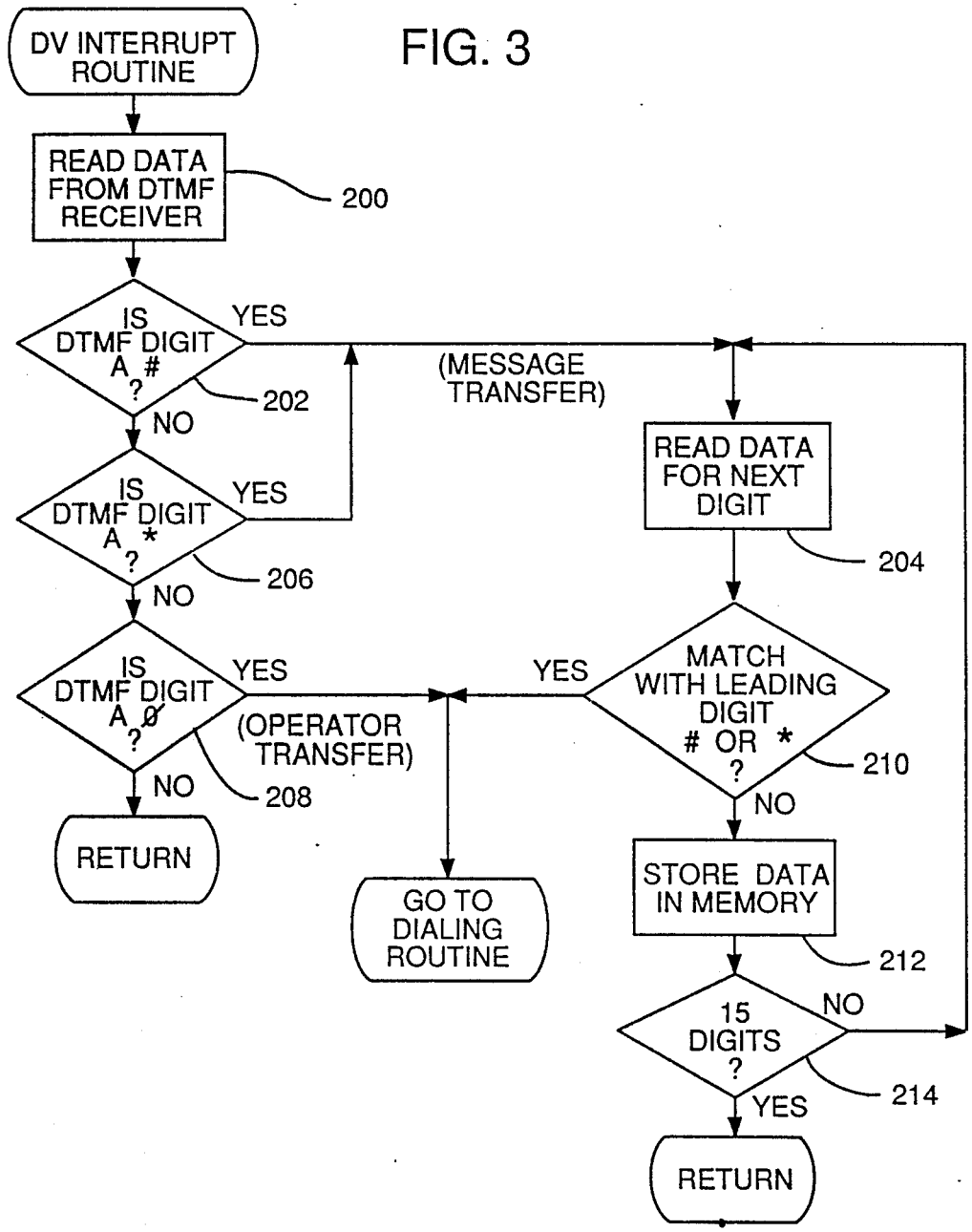
FIG. 3 is a flowchart of the DV interrupt routine in accordance with the present invention which is executed by the microprocessor shown in FIG. 2.

Referring now to FIG. 3, a flowchart is shown for the DV interrupt routine. In accordance with the first step 200, the microprocessor 20 reads data representing the digit tone received by the DTMF receiver 40 from the DTMF receiver 40 over the bus 132 and proceeds to step 202. In step 202 the microprocessor 20 compares this data from the DTMF receiver 40 to data corresponding to a # digit (symbol). If the data corresponds to a # digit the microprocessor 20 proceeds to step 204. If the data does not correspond to the # digit, the microprocessor 20 proceeds to the step 206. In step 206 the microprocessor 20 compares the data from the DTMF receiver 40 to data corresponding to a * digit (symbol). If the data corresponds to a * digit, the microprocessor proceeds again to step 204. If the data does not correspond to the * digit, the microprocessor 20 executes step 208. In step 208 the microprocessor compares the data to data corresponding to a ∅ digit. If the data corresponds to the ∅ digit, the microprocessor 20 proceeds to the dialing routine shown in FIG. 4 (eventually leading to call transfer to an operator). If the data does not correspond to a ∅ digit the microprocessor 20 returns to the primary message recording routine.

In step 204 the microprocessor reads the data for the next digit tone received by the DTMF receiver 40 over the bus 132. Thereafter, the microprocessor 20 executes step 210 in which it compares the data read in step 204 to data for a # digit and data for a * digit. If the data corresponds to either a # or a * digit, the microprocessor 20 proceeds to the dialing routine shown in FIG. 4 (eventually leading to call transfer). If the data does not correspond to either a # or a * digit, the microprocessor 20 executes step 212 in which it stores the data for the digit compared in step 210 in memory and proceeds to step 214. In step 214 the microprocessor 20 checks to see if 15 digits worth of data have been previously stored in memory. If data for 15 digits have not been stored in memory, the microprocessor 20 jumps back to again execute step 204 (and read data for another digit). If data for 15 digits have been stored in memory, the microprocessor 20 returns to the primary message recording routine. Steps 204, 210, 212 and 214 constitute a loop for storing a set of data corresponding to the digits of a telephone number, extension number or operator number to which the calling party desires to be transferred.

The DTMF generator 50 generates digit tone signals which are provided over the line 58 to the analog multiplexer 42. The DTMF generator 50 operates in accordance with data signals supplied over the bus 132 by the microprocessor 20. The line 154 is used by the microprocessor 20 to transmit the required enable signals to the DTMF generator 50 for its proper operation. The digit tone signals from the DTMF generator 50 are routed from the analog multiplexor 42 to the audio amplifier 62 on line 64, from the amplifier 62 to the switching module 46 on line 68 and from the module 46 to the line interface 24 on line 82 in response to control signals from the microprocessor 20.

Figure 4:
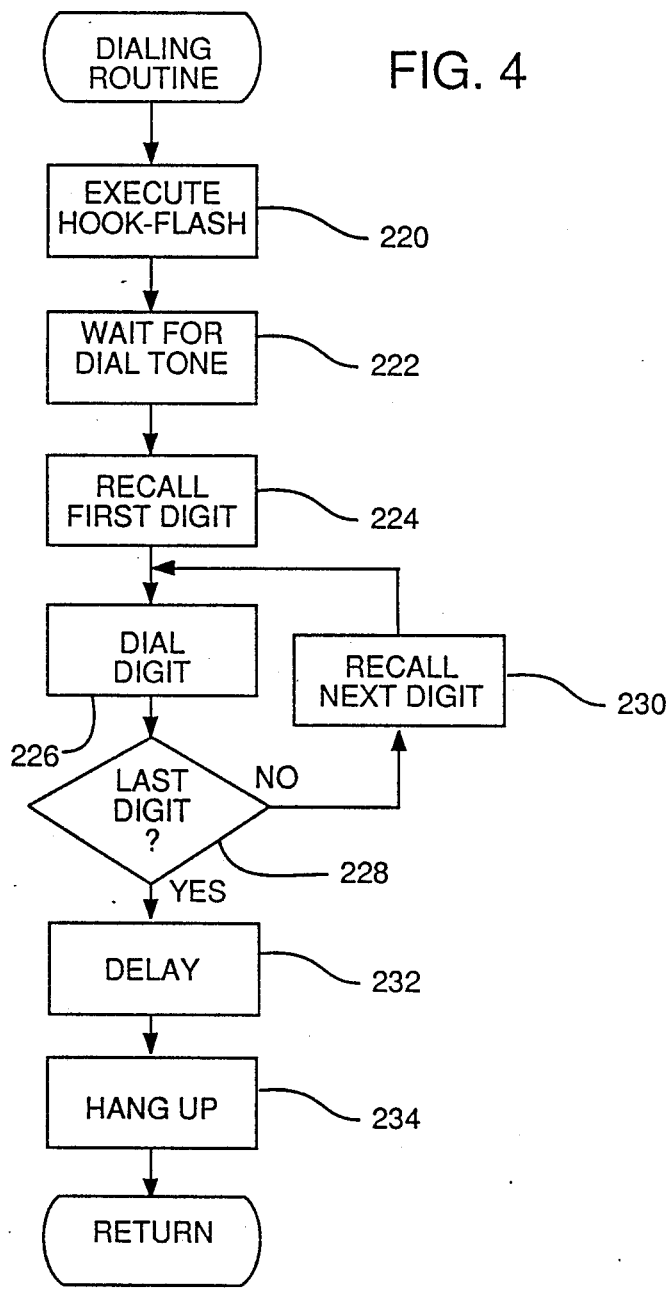
FIG. 4 is a flowchart of the dialing routine in accordance with the present invention which is executed by the microprocessor shown in FIG. 2 upon being entered from the DV interrupt routine shown in FIG. 3.

Referring now to FIG. 4, a flowchart is shown for the dialing routine in accordance with which the functioning of DTMF generator 50 is controlled by the microprocessor 20. In the first step 220 the microprocessor executes a hook flash operation by utilizing the LS relay 26. The microprocessor 20 then proceeds to step 222 in which it delays further operations long enough to allow the PBX system 12 to provide a dial tone signal on the external telephone circuit. Thereafter, the microprocessor 20 proceeds to step 224 in which it recalls from memory the data corresponding to the first digit received. The microprocessor 20 then executes step 226 in which it regulates the operation of the DTMF generator 50 to generate a digit tone signal in accordance with data signals supplied over the bus 132 corresponding to the digit recalled. The microprocessor 20 also controls the analog multiplexer 42 and switching module 46 to route the dial tone signal to the line interface 24 (and the external telephone line circuit). Individual digits may be thereby effectively "dialed" by the answering machine.

The microprocessor 20 then proceeds to step 228 in which it checks to see if the last digit in memory has been dialed (i.e. used for generating a digit tone). If the last digit has not been dialed, the microprocessor executes step 230 and recalls the next digit in the order in which the data for the digits was received. Thereafter, the microprocessor jumps back to again execute step 226. Steps 226, 228 and 230 constitute a loop which is operative for dialing all of the digits in memory in the order received. When the last digit has been dialed the microprocessor 20 proceeds to step 232 in which it delays further operations for long enough to allow the PBX system 12 to make the necessary line connections to the telephone station dialed. Thereafter, the microprocessor 20 proceeds to step 234 in which it breaks the circuit connection to the answering machine by means of the LS relay 26 and effectively hangs up thereby taking the answering machine on hook. The line carrying the original incoming call from the calling party remains coupled to the telephone station dialed by the answering machine. When the telephone dialed by the answering machine is answered, the original calling party is placed in communication with the party on the telephone at the number dialed by the answering machine in accordance with the number corresponding to the digit tones provided by the calling party. Thereafter, the microprocessor 20 returns to the main program governing the operation of the answering machine. It should be noted that the DV interrupt and dialing routines are subject to time limitations for completion so that, for instance, should required signals fail to be received the microprocessor 20 will eventually return to its main program.

As may be apparent from the preceding description, certain changes may be made in the above constructions without departing from the scope of the invention. Therefore, the embodiment described and the drawings are intended to be illustrative in nature and are not meant to be interpreted as limiting the following claims.

I claim:

1. A telephone answering machine connectable to any selected one of a plurality of telephone station lines of a telephone switching system, wherein the telephone system connects a caller's outside telephone line with a telephone station line designated by the caller, and wherein the telephone system initiates the connection by providing a signal on the caller-designated telephone station line, the telephone answering machine comprising:

message means for receiving and transmitting messages;

interface means connected to a first telephone station line for connecting the message means with the first telephone station line in response to a first signal provided on the first telephone station line by the telephone system, the connection being made in the absence of signals generated by the caller subsequent to the first signal;

control means for enabling the message means to receive or transmit messages over the first telephone station line and for monitoring the first telephone station line to detect a second signal generated by a caller whose outside line is connected with the first telephone station line, wherein the second signal includes an extension number for a second telephone station line; and transfer means for storing the extension number included in the second signal and for retrieving the stored extension number to generate transfer signals suitable for directing the telephone system to transfer the outside caller to the second telephone station line.

2. The machine of claim 1 wherein the control means and interface means are associated for permitting a caller to recite a message for receipt by the message means before the caller generates a second signal.

3. The machine of claim 2 wherein the interface means includes audio transmission means for providing transmission of audio signals over the first telephone station line to the message means in response to the first signal, the control means interrupting the transmission of audio signals whenever the caller begins to generate a second signal.

4. The machine of claim 1 wherein the first signal is a ring signal.

5. A method for operating a telephone answering machine that is connectable to any selected one of a plurality of telephone station lines of a telephone switching system, wherein the telephone system connects a caller's outside telephone line with a telephone station line designated by the caller, and wherein the telephone system initiates the connection by providing a signal on the caller-designated telephone station line, the method comprising the steps of:

connecting a first telephone station line to a message mechanism for receiving and transmitting messages, wherein the connection is made in response to a first signal provided on the first telephone station line by the telephone system and wherein the connection is made in the absence of signals generated by the caller subsequent to the first signal;

monitoring the first telephone station line to detect a second signal generated by the caller whose outside line is connected with the first telephone station line, wherein the second signal includes an extension number for a second telephone station line;

storing the extension number included in the second signal; and retrieving the stored extension number to generate transfer signals suitable for directing the telephone system to transfer the outside caller to the second telephone station line.

6. The method of claim 5 further including the step of connecting the first telephone station line with the message mechanism to permit a caller to recite a message for receipt by the message mechanism before the caller generates a second signal.

7. The method of claim 5 further including the steps of connecting the first telephone station line with the message mechanism to permit transmission of audio signals over the first telephone station line to the message mechanism in response to the first signal, and interrupting the transmission of audio signals whenever the caller begins to generate a second signal.

8. The method of claim 5 wherein the first signal is a ring signal.

* * * * *